(12) United States Patent
Jitsukawa et al.

(10) Patent No.: US 7,209,512 B2
(45) Date of Patent: Apr. 24, 2007

(54) CDMA RECEIVER, AND SEARCHER IN A CDMA RECEIVER

(75) Inventors: Daisuke Jitsukawa, Kawasaki (JP); Masafumi Tsutsui, Kawasaki (JP); Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1066 days.

(21) Appl. No.: 10/233,180

(22) Filed: Aug. 28, 2002

(65) Prior Publication Data

US 2003/0012267 A1 Jan. 16, 2003

Related U.S. Application Data

(63) Continuation of application No. PCT/JP00/01322, filed on Mar. 6, 2000.

(51) Int. Cl.
*H04B 1/00* (2006.01)
(52) U.S. Cl. .................. 375/148; 375/150; 375/147; 370/142
(58) Field of Classification Search ............... 375/147, 375/148, 150; 370/342
See application file for complete search history.

(56) References Cited

U.S. PATENT DOCUMENTS

| 6,064,338 | A  | * | 5/2000 | Kobayakawa et al. | 342/378 |
|---|---|---|---|---|---|
| 6,385,181 | B1 | * | 5/2002 | Tsutsui et al. | 370/335 |
| 6,665,286 | B1 | * | 12/2003 | Maruta et al. | 370/342 |
| 6,714,584 | B1 | * | 3/2004 | Ishii et al. | 375/148 |
| 6,904,076 | B1 | * | 6/2005 | Tsutsui et al. | 375/130 |

FOREIGN PATENT DOCUMENTS

| EP | 0 936 755 A2 | 8/1999 |
|---|---|---|
| EP | 0 949 769 A1 | 10/1999 |
| JP | 11-266180 | 9/1999 |
| JP | 11-274976 | 10/1999 |

OTHER PUBLICATIONS

Aoyama, et al. CDMA Path-Search Sheme Using Combined Delay Profile of Diversity Antennas, IEICE vol. 99 pp. 25-30, Jul. 23, 1999.

* cited by examiner

*Primary Examiner*—Temesghen Ghebretinsae
*Assistant Examiner*—Juan Alberto Torres
(74) *Attorney, Agent, or Firm*—Katten Muchin Rosenman LLP (57) ABSTRACT

In a searcher of a CDMA receiver comprising an array antenna, a voltage profile generation portion performs correlation computations of received signals for each antenna element and generates received signal voltage profiles; a phase difference estimation portion uses sample data from each voltage profile at the same time to perform correlation calculations among antenna elements and estimates the phase difference among antenna elements at the above time, and similarly estimates the phase differences among antenna elements at each time. An in-phase synthesis portion uses the phase difference estimate at a prescribed time to coordinate the phases of voltage profiles for each antenna element at the above time and performs synthesis, and similarly coordinates the phases of each antenna element voltage profile at other times and performs synthesis; and, a path detection portion detects the path timing of multiple paths based on the synthesized profile obtained by the in-phase synthesis portion.

10 Claims, 8 Drawing Sheets

CDMA RECEIVER, AND SEARCHER IN A CDMA RECEIVER

This application is a continuation of international application number PCT/JP00/01322, filed Mar. 6, 2000.

BACKGROUND OF THE INVENTION

Digital cellular wireless communication systems employing the DS/CDMA (Direct Sequence Code Division Multiple Access) method are being developed as next-generation mobile communication systems enabling wireless multimedia communication. An array antenna for wireless base stations is effective for increasing the subscriber capacity of a mobile communication system adopting DS/CDMA and for reducing the transmission power of mobile stations.

This invention relates to a CDMA receiver comprising an array antenna, and a searcher for the above CDMA receiver. In particular, this invention relates to a searcher which synthesizes a phase-adjusted voltage profile, obtained by performing correlation computation of signals received by each antenna element of the array antenna, and which detects the path timing for multiple paths using this synthesized voltage profile, and also relates to the CDMA receiver of a wireless base station using this searcher.

In a mobile communication system using DS/CDMA, (1) the RAKE reception method, (2) the array antenna method, and (3) transmission power control, are well-known as component technologies to increase subscriber capacity and reduce the transmitting power of mobile stations. The RAKE reception method attempts to improve characteristics by utilizing signals arriving via each path among multiple paths. Mobile communication is characterized in that radio waves output from a transmitter follow a number of propagation paths (multiple paths, or multipath), with different path lengths, to arrive at a receiver. In the RAKE reception method, signals propagating over different paths are identified, reliability weightings are assigned, and synthesis performed to improve the signal-to-noise ratio (SNR). In the array antenna method, gain is improved by narrowing the directionality pattern, and the SNR is improved by reducing interfering signals. In transmission power control, the transmitting power of the transmitter is controlled such that the received signal SNR is held constant.

Figure 6:
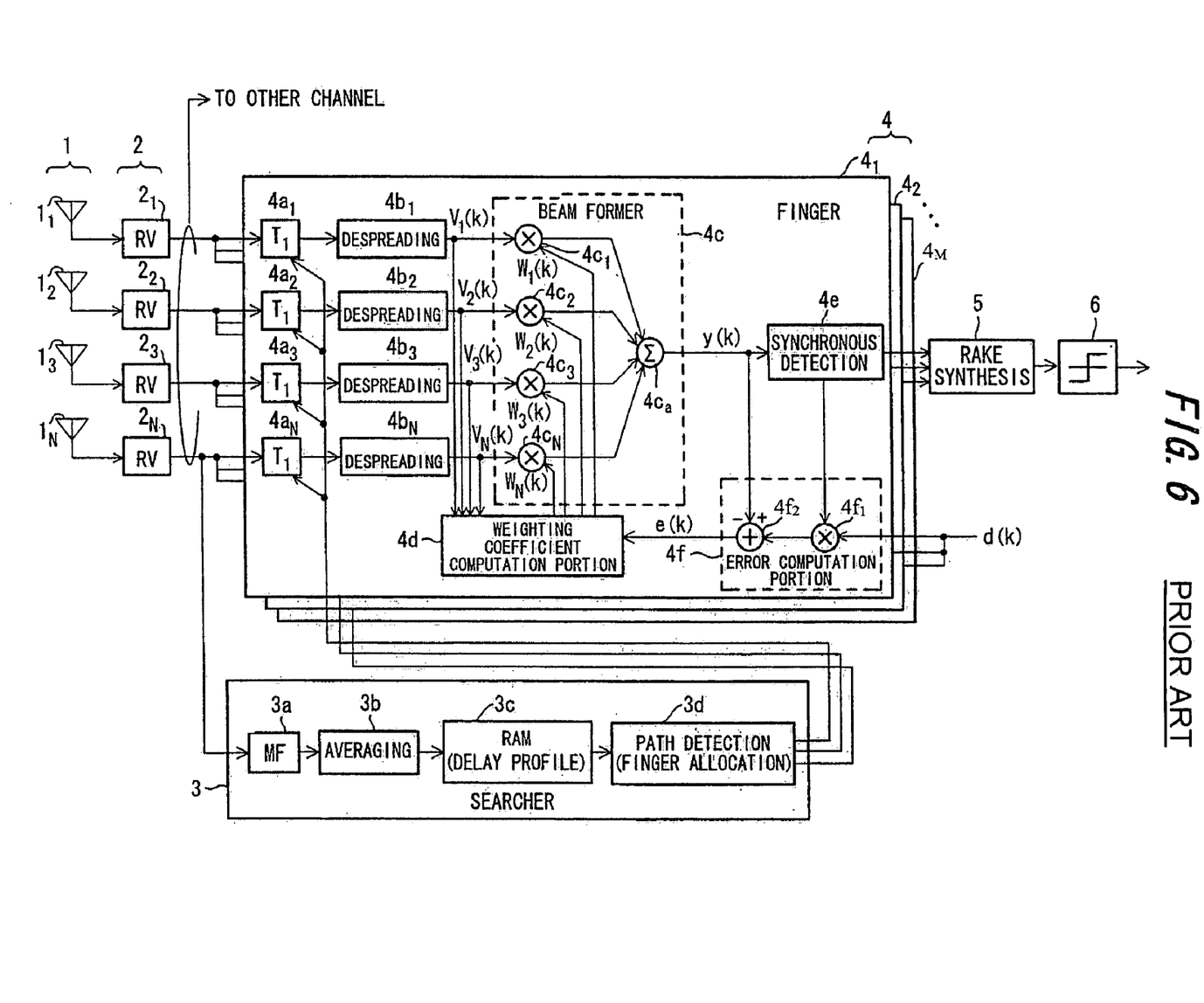
FIG. 6 is a view of the configuration of a conventional DS/CDMA wireless base station receiver, employing an array antenna and RAKE reception method.

FIG. 6 is a diagram of the configuration of the receiver of a DS/CDMA wireless base station employing an array antenna and RAKE reception method. In the FIG. 1 is an array antenna for reception, having N antenna elements $1_1$ to $1_N$ (in the figure, four). $2_1$ to $2_N$ are reception circuits (RV) which amplify the RF signal which is the antenna output, and then perform frequency conversion to a baseband signal (RF→IF conversion), execute quadrature detection (QPSK demodulation) for the baseband signal, and performs A/D conversion to output the demodulated signal in digital form. Through quadrature detection, an in-phase component I and a quadrature component Q are obtained. 3 is a searcher, $4_1$ to $4_M$ are finger portions provided corresponding to each of the multiple paths, 5 is a RAKE synthesis portion which synthesizes the output of each of the finger portions, and 6 is a discrimination portion which discriminates between "1" and "0" among the received data, based on output from the RAKE synthesis portion. The array antenna 1 and reception circuit 2 are provided in common for all channels, and the searcher 3, finger portions 4, RAKE synthesis portion 5, and discrimination portion 6 are provided for each channel.

Figure 7:
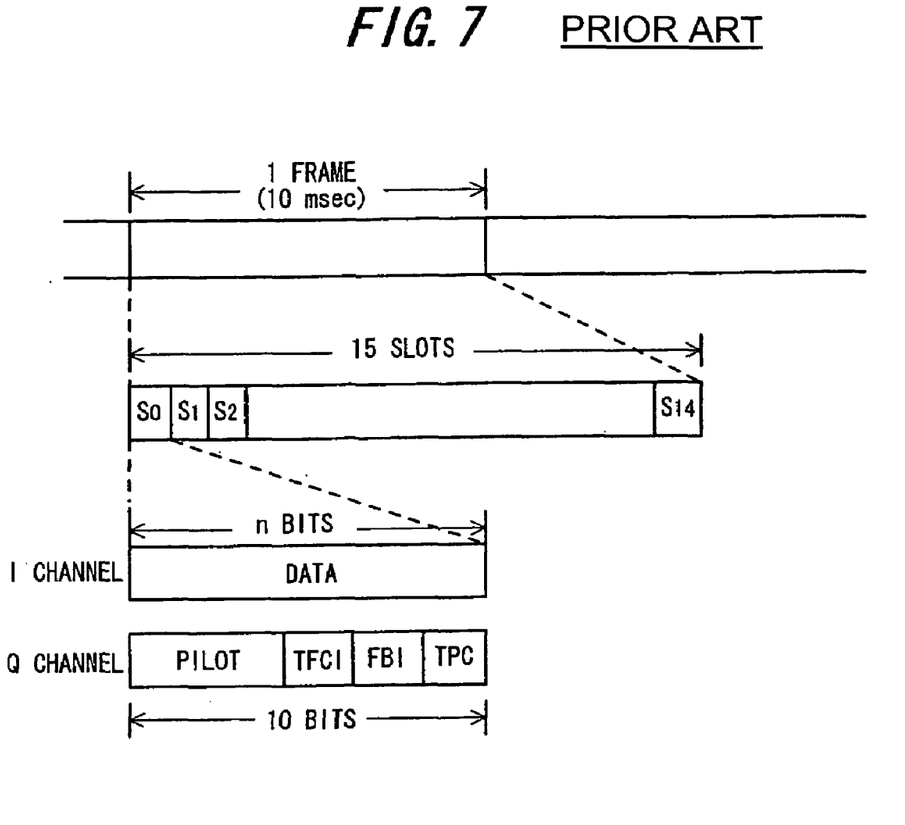
FIG. 7 explains the frame format for uplink signals from a mobile station to the base station.

FIG. 7 explains the frame format for uplink signals from a mobile station to the base station. One frame is 10 msec, and comprises 15 slots, $S_0$ to $S_{14}$. The data portion is mapped onto the I channel in QPSK modulation, and the part other than the data portion is mapped onto the Q channel in QPSK modulation. Each of the slots in the I channel over which the data portion is transmitted comprises n bits, where n varies according to the symbol rate. Each of the slots of the Q channel transmitting control data comprises 10 bits (10 symbols), and the symbol rate is constant at 15 ksps; the pilot PILOT, transmission power control data TPC, transport format combination indicator TFCI, and feedback information FBI are transmitted. PILOT is used in synchronous detection on the receiving side and in SIR measurements; TPC is used in transmitting power control; TFCI transmits the data symbol rate and the number of bits per frame; and FBI controls the transmission diversity at the base station. This I channel data and Q channel data is subjected to QPSK modulation and is transmitted on the transmitting side, and on the receiving side is QPSK demodulated and restored.

Figure 8:
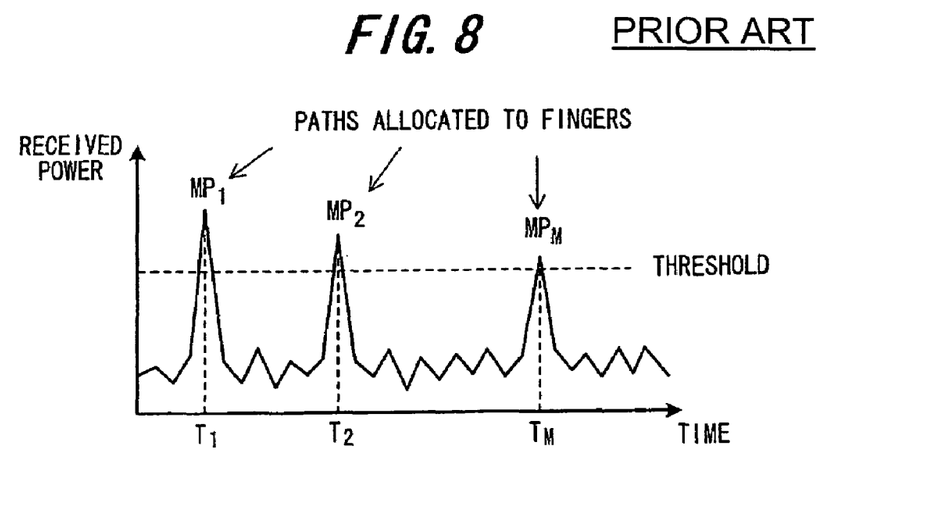
FIG. 8 explains a multipath.

As shown in FIG. 8, in mobile communications the reception level in the receiver of signals sent from the transmitter varies depending on the multipath, and the time of arrival at the receiver also differs. The searcher 3 measures the profile of power received by the antenna (change with time in the power level, called the delay profile), and referring to this delay profile, detects multiple paths among the multipath signals $MP_1$ to $MP_M$ higher than a threshold value, identifies the times of occurrence $T_1$ to $T_M$ of each of these multiple paths or the delay times from a reference time, and inputs, to the finger portions $4_1$ to $4_M$ corresponding to each path, timing information for the start of despreading and delay time information.

In the searcher 3, the matched filter 3a uses the spreading code for the channel to extract and output the pilot signal component (one symbol's worth) for the channel from the signal received by the prescribed antenna element $1_N$. That is, when a direct sequence signal which has been affected by multipath is input, the matched filter 3a outputs a pulse train having a plurality of peaks corresponding to arrival times and signal strengths (FIG. 8). The pilot signal is affected by noise on the communication path, and so the averaging circuit 3b adds the voltages of the correlated output for each symbol over a prescribed pilot signal segment (one-slot segment) in order to reduce the effect of this noise, in an attempt to improve the SNR of the received signal in path timing detection. The power calculation portion, not shown, converts the output signal of the averaging circuit 3b into power, and the delay profile RAM 3c stores the delay profile converted into this power and the path detection portion 3d detects each path among the multiple paths and the delay times $T_1$ to $T_M$, referring to the delay profile stored in RAM, and inputs the timing information for the start of despreading and delay time information to the finger portions $4_1$ to $4_M$ corresponding to each path.

The finger portions $4_1$ to $4_M$ corresponding to each of the multiple paths are of the same configuration, and have delay time adjustment portions $4a_1$ to $4a_N$, despreading circuits $4b_1$ to $4b_N$, a beam former $4c$, weighting coefficient computation portion $4d$, synchronous detection circuit $4e$, and error computation portion $4f$.

The delay time adjustment portions $4a_1$ to $4a_N$ adjust the delay time of signals received from each antenna element corresponding to a path (in actuality, I channel signals and Q channel signals) based on delay time information, to coordinate the timing of signals for different paths. The despreading circuits $4b_1$ to $4b_N$ multiply the spreading code assigned to the channel by the output signals of the delay time adjustment portions $4a_1$ to $4a_N$, based on despreading start timing information, to perform despreading. The beam former 4c having N multipliers $4c_1 \ldots 4c_N$ (in FIG. 6) and an adder $4c_a$ forms antenna directionality by adding a weighting to the output signals of each of the despreading circuits. That is, if the despreading circuit output for the kth symbol of the nth antenna element is $v_n(k)$ and the weighting coefficient is $\omega_n(k)$, then the beam former 4c outputs the weighting synthesis signal y(k) expressed by the equation $$y(k) = \sum_{n=1}^{N} \omega_n(k) v_n(k) \quad (1)$$

The weighting coefficient computation portion 4d computes the weightings $w_1(k)$ to $w_N(k)$ in the beam former 4c from the LMS (Least Mean Square) adaptive algorithm, which is well known. Channel estimation is performed by the synchronous detection circuit 4e based on phase differences between the pilot signal contained in the received signal and the known pilot signal, and the complex conjugate $\xi^*$ of the channel estimate $\xi$ is multiplied by the weighting synthesis signal (bean farmer output) to perform phase rotation processing (synchronous detection). The RAKE synthesis portion 5 synthesizes the synchronous detection output of each of the finger portions, and the data discrimination portion 6 performs data discrimination based on the RAKE synthesis output. This data discrimination result is fed back in order to determine weighting coefficients using the LMS adaptive algorithm.

The error computation portion 4f performs operations on the weighting synthesis signal y(k) and its error e(k) with the data discrimination results (pilot signal d(k)), and inputs the result to the weighting coefficient computation portion 4d. In the data discrimination result, the phase rotates in the synchronous detection circuit 4e by the amount of multiplication by the complex conjugate of the channel estimate $\xi$. In the error computation portion 4f, then, the multiplier $4f_1$ multiplies the discrimination result by the channel estimate $\xi$ to return the phase to its original value, and in the error computation portion $4f_2$ the error e(k) between the discrimination result with phase returned (pilot signal) and the weighting synthesis signal is computed, and the result input to the weighting coefficient computation portion 4d.

The weighting coefficient computation portion 4d computes the weightings $w_1(k)$ to $w_N(k)$ from the LMS adaptive algorithm. That is, if the weighting coefficient for the (k+1)th symbol of the nth antenna element is $w_n(k+1)$, and the weight coefficient of the kth symbol is $w_n(k)$, then $w_n(k+1)$ can be computed from:

$$w_n(k+1) = w_n(k) + \mu \, e^*(k) v_n(k) \quad (2)$$

$$e(k) = \xi \cdot d(k) - y(k) \quad (3)$$

Here $\mu$ is the step coefficient, e(k) is the error signal given by eq. (3), $^*$ indicates a complex conjugate, $\xi$ is the channel estimate, and d(k) is the pilot signal used as the reference signal.

As described above, by adding a weighting to the signals received from each antenna element using the beam former, antenna directionality can be formed, so that gain can be increased and interference signals can be reduced. And by adopting the RAKE reception method, each of the signals arriving via multiple paths can be utilized, so that the SNR can be improved.

Figure 9:
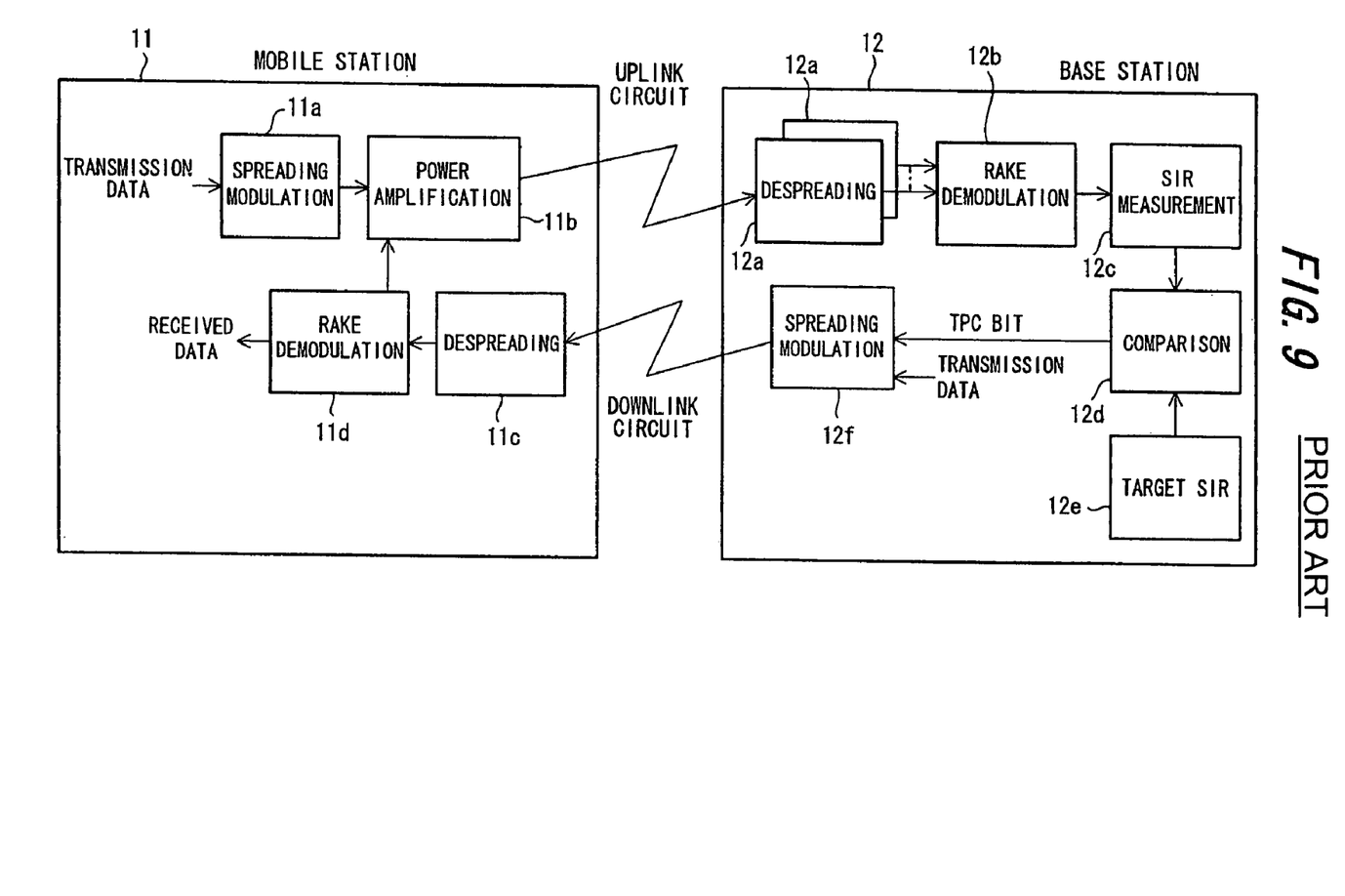
FIG. 9 explains uplink circuit closed-loop transmission power control.

FIG. 9 explains uplink circuit closed-loop transmission power control. In the mobile station 11, the spreading modulation portion 11a uses a spreading code according to the prescribed channel specified by the base station to perform spreading modulation of transmission data, and the power amplifier 11b performs quadrature modulation after spreading modulation, frequency conversion and other processing, amplifies the input signal, and transmits the signal to the base station 12 from the antenna. At the base station 12, the despreading portions 12a of the finger portion corresponding to each path performs despreading processing for delayed signals arriving via the allocated path, and the RAKE demodulation portion 12b synthesizes the signals output from each finger, and discriminates between "1" and "0" among the received data based on the synthesized signals.

The SIR measurement portion 12c measures the power ratio (SIR, Signal Interference Ratio) of the received signal to the interference signal, including thermal noise. The comparison portion 12d compares the target SIR and the measured SIR, and if the measured SIR is larger than the target SIR, creates a command to lower the transmission power by 1 dB using a TPC (Transmission Power Control) bit, whereas if the measured SIR is small, creates a command to raise by 1 dB the transmission power using the TPC bit. The target SIR is the SIR value necessary to obtain a BER of, for example, $10^{-3}$ (corresponding to the occurrence of an error once every thousand times), and is input to the comparison portion 12d from the target SIR setting portion 12e. The spreading modulation portion 12f performs spreading modulation of the transmission data and TPC bit. After spreading modulation, the base station 12 performs D/A conversion, quadrature modulation, frequency conversion, power amplification and other processing, and transmits to the mobile station 11 from the antenna. The despreading portion 11c of the mobile station 11 performs despreading processing of the signal received from the base station 12, the RAKE demodulation portion 11d demodulates the received data and TPC bit, and the transmission power of the power amplifier 11b is controlled according to the command indicated by the TPC bit.

In the receiver of a DS/CDMA wireless base station employing an array antenna, it is possible to raise the gain and reduce interference signals; but if transmission power is controlled, the reception SNR per element of the antenna 1 drops compared with a receiver not employing an array antenna. If the reception SNR per element of the antenna 1 falls, the effect of noise is increased in the searcher 3, and there is the problem that path searches cannot be performed accurately. In order to maximize the effect of the RAKE reception method, it is essential that path searches be performed accurately; the above problem complicates the introduction of an array antenna to a DS/CDMA mobile communication system.

SUMMARY OF THE INVENTION

An object of this invention is to enable high-precision path searches in a wireless base station employing an array antenna.

A searcher in a CDMA receiver with an array antenna according to the first invention comprises (1) a voltage profile generation portion, which performs correlation computation of received signals for each antenna element and generates received signal voltage profiles; (2) a phase difference estimation portion, which performs correlation calculations between antenna elements using sample data for the same instant from each voltage profile, and estimates phase differences between antenna elements at that instant;

(3) an in-phase synthesis portion, which uses estimated phase differences at each instant to coordinate the phases of the voltage profiles for each antenna element at that instant, and performs synthesis; and, (4) a path detection portion, which detects path timing for multiple paths based on the synthesized profile obtained by the in-phase synthesis portion. In the searcher of this invention, the in-phase synthesis portion coordinates the phases of the voltage profiles for each antenna element and performs synthesis, so that antenna directionality can be formed and path searches can be performed, and accurate path searches become possible even if the SNR of an antenna element falls due to transmission power control.

A searcher in a CDMA receiver with an array antenna according to the second invention comprises (1) a voltage profile generation portion, which performs correlation computation of received signals for each antenna element and generates voltage profiles; (2) a correlation computation portion, which performs correlation calculations among antenna elements using sample data corresponding to prescribed path timing detected at the time of the previous detection, among the sample data constituting each voltage profile, estimates phase differences among antenna elements for the path timing in question, and similarly uses sample data corresponding to other path timing to estimate phase differences among antenna elements for the path timing in question; (3) a phase difference estimation portion, which takes the above estimated phase difference between antenna elements with the path timing for which the correlation is maximum as an estimate of the common phase difference among antenna elements with all timings; (4) an in-phase synthesis portion, which uses the above common estimated phase difference at all timings to coordinate the phases of the voltage profiles of received signals for each antenna element, and performs synthesis; and, (5) a path detection portion, which detects the path timings of multiple paths based on the synthesized profile obtained by the in-phase synthesis portion. In the searcher of this invention, estimation of phase differences between antenna elements is limited to the path timings of multiple paths detected at the time of the previous detection, and a common phase difference for all timings is estimated from these, so that in-phase synthesis of a voltage profile for each antenna element can be performed using less hardware and with fewer calculations than in the first invention, and in addition accurate path searching is possible, given the premise that dispersion in the directions of arrival of the multiple paths is small.

Figure 1:
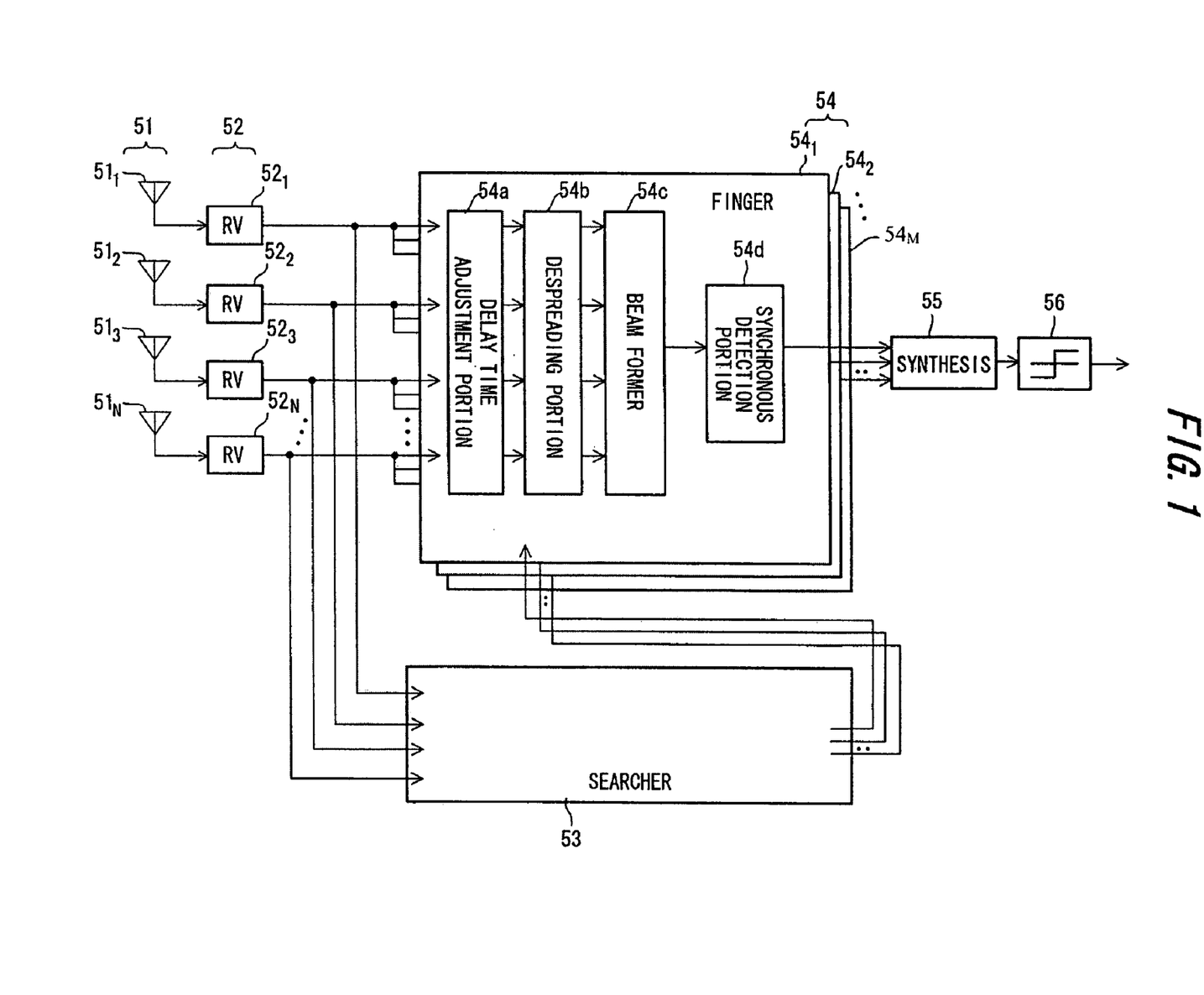
FIG. 1 is a summary view of the overall configuration of a receiver with array antenna of a DS/CDMA wireless base station, according to this invention.

DESCRIPTION OF THE PREFERRED EMBODIMENTS (A) Summary Overall Configuration of Receiver with Array Antenna FIG. 1 is a summary view of the overall configuration of a receiver with array antenna of a DS/CDMA wireless base station of this invention. In the FIG. 51 is an array antenna for reception, having N antenna elements $51_1$ to $51_N$ (in the figure, four). $52$ to $52_N$ are reception circuits (RV), which amplify the RF signals which are the antenna output, and then perform frequency conversion to a baseband signal (RF→IF conversion), execute quadrature detection (QPSK demodulation) of the baseband signal thus obtained, and then perform A/D conversion of the demodulated signal into digital form. 53 is the searcher of this invention, and $54_1$ to $54_M$ are finger portions provided to correspond to each path of multiple paths; though details are not shown, each finger portion has a configuration similar to that of a conventional finger (with delay time adjustment portion 54a, despreading portion 54b, beam former 54c, synchronous detection portion 54d, and similar). 55 is a RAKE synthesis portion which synthesizes the output of each finger; 56 is a discrimination portion which discriminates between "1" and "0" among the received data based on the RAKE synthesis portion output. The array antenna 51 and reception circuit 52 are provided in common for all channels; the searcher 53, finger 54, RAKE synthesis portion 55, and discrimination portion 56 are provided for each channel.

(B) First Embodiment of a Searcher (a) Configuration

Figure 2:
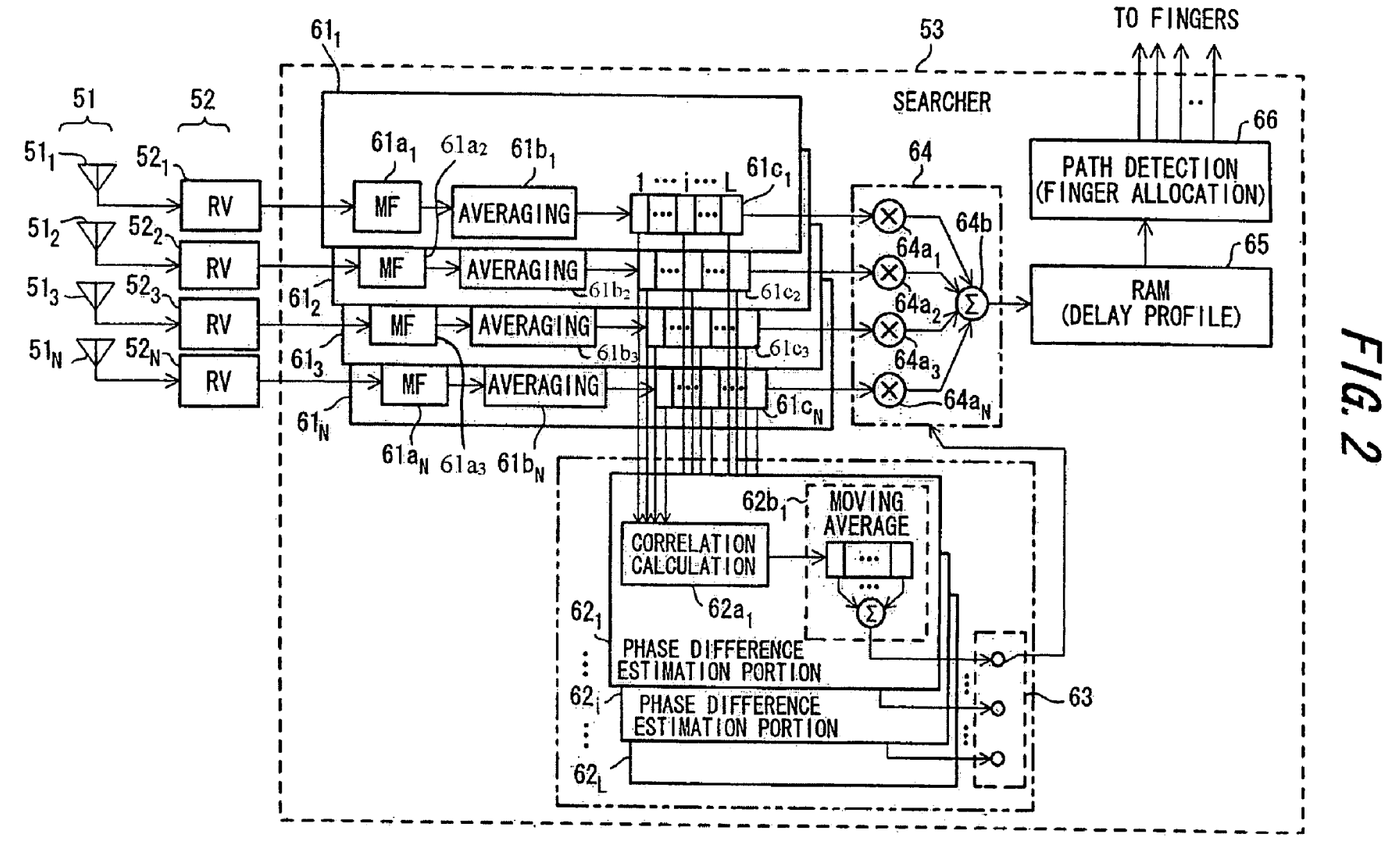
FIG. 2 is a view of the configuration of a first embodiment of a searcher of this invention.

FIG. 2 is a view of the configuration of a first embodiment of a searcher of this invention. In the searcher 53, the voltage profile generation portions $61_1$ to $61_N$ take as input the QPSK detection signals (Q channel signals) output from the reception circuits $52_1$ to $52_N$, and generate a voltage profile for each antenna element. For example, the voltage profile generation portion $61_1$ ($61_2$ . . . $61_N$) extracts one symbol's worth of the pilot signal component for the channel in the matched filter $61a_1$, ($61a_2$ . . . $61a_N$) in the averaging circuit $61b_1$ ($61b_2$ . . . $61b_N$) performs voltage addition of the correlation output for each symbol in a prescribed pilot signal interval (for example, one slot interval) to perform averaging, and stores in RAM $61c_1$ ($61c_2$ . . . $61c_N$) one symbol's worth (one bit) of the voltage profile averaged by the averaging circuit $61b_1$ ($61b_2$ . . . $61b_N$). The voltage profile comprises first through Lth sample data. Here L is determined by the number of chips of the spreading code equivalent to, for example, one symbol; when oversampling is performed, L is the oversampling multiple.

The phase difference estimators $62_1$ to $62_L$ perform correlation calculations among antenna elements using the first through Lth sample data at times $t_1$ to $t_L$ of each voltage profile, and estimate and output the phase differences $\Delta\theta_1$ to $\Delta\theta_L$ among antenna elements at times $t_1$ to $t_L$. For example, the correlation computation portion $62a_1$ of the phase difference estimator $62_1$ uses sample data at the first time $t_1$ of each voltage profile to perform correlation calculations among antenna elements, and estimates the phase difference $\Delta\theta_1$ among antenna elements at the time in question; the moving average computation portion $62b_1$ computes the moving average of S estimated phase differences in the most recent S slot interval, and outputs the moving average as the phase difference among antenna elements at time $t_1$. The switch 63 selectively outputs the phase differences $\Delta\theta_1$ to $\Delta\theta_L$ estimated by the phase difference estimators $62_1$ to $62_L$ at times $t_1$ to $t_L$.

The in-phase synthesis portion 64 uses the phase difference estimations $\Delta\theta_i$ (i=1 to L) at prescribed times $t_i$ (i=1 to L) to coordinate the phases of voltage profiles for each antenna element at each time, perform synthesis, and output a synthesized signal. That is, the in-phase synthesis portion 64 comprises multipliers $64a_1$ to $64a_N$ and a synthesis portion 64b; the multipliers $64a_1$ to $64a_N$ use phase difference estimates $\Delta\theta_i$ at times $t_i$ to shift the phase of the voltage profiles of the first through Nth antenna elements by amounts $(n-1)\cdot\Delta\theta_i$ (n=1 to N), and the synthesis portion 64b synthesizes and outputs the outputs of each of the multipliers. The multipliers $64a_1$ to $64a_N$ multiply the respective input signals by $\exp[-j(n-j(n-1)\cdot\Delta\theta_i]$ to shift the phase.

The RAM 65 stores the delay profiles obtained by converting the synthesized voltage profiles output by the in-phase synthesis portion 64 into power levels; the path detection portion 66 references the delay profiles in detecting the path timing of multiple paths, and inputs despreading start timing information and delay time information to the finger portions $54_1$ to $54_M$ (cf. FIG. 1) corresponding to each path.

(b) Estimation of Phase Differences Among Antenna Elements

The phase difference estimators $62_1$ to $62_L$ estimate the phase differences $\Delta\theta_1$ to $\Delta\theta_L$ among the antenna elements at times $t_1$ to $t_L$ through correlation calculations. The ith sample data of the voltage profile of the nth antenna element is expressed as follows.

$$x_{ni} = a_{ni} \exp[j\{\alpha+(n-1)\Delta\theta i\}] + \eta_{ni} \text{ (i: path timing)}$$

$$x_{ni} = \eta_{ni} \text{ (i: non-path timing)} \qquad (4)$$

Figure 3:
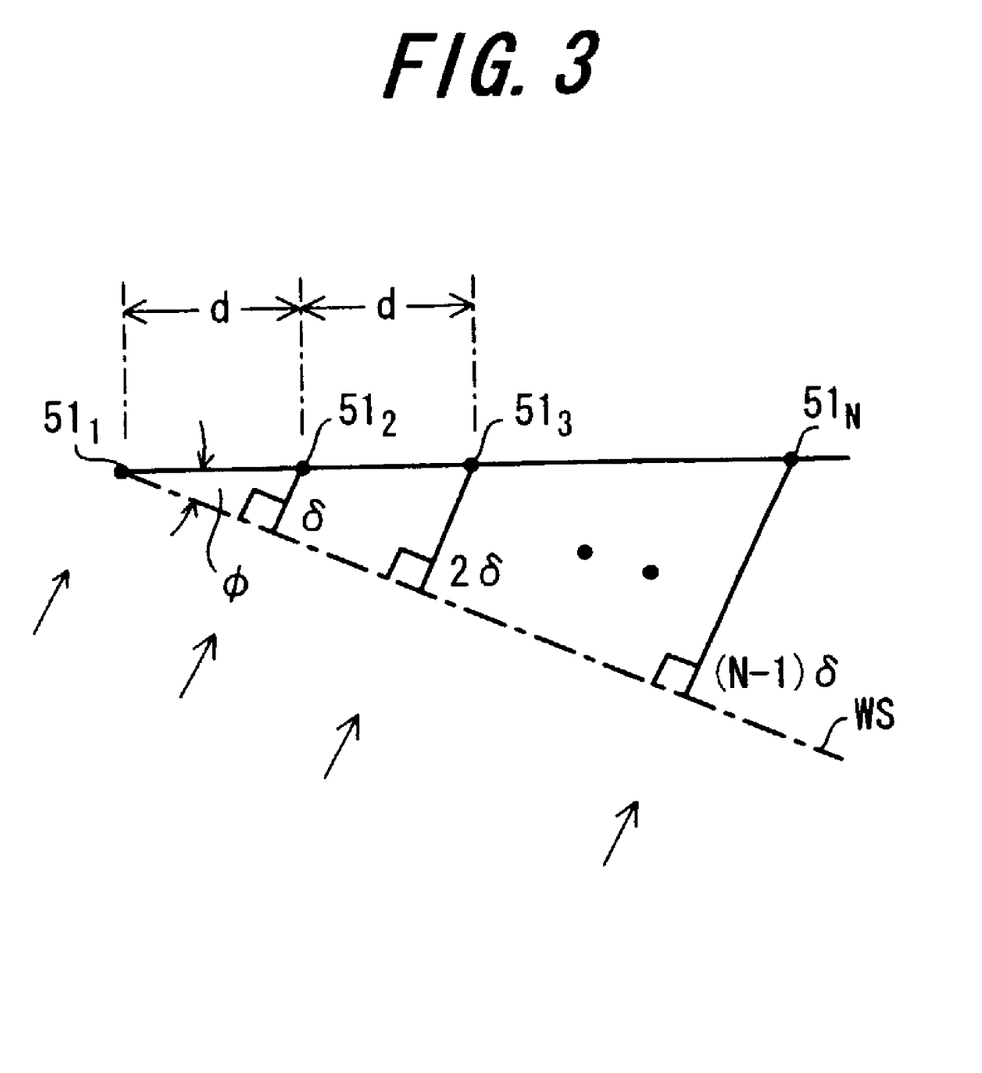
FIG. 3 explains the ith sample data in the voltage profile of the nth antenna element.

In the above equation, $a_{ni}$ is the signal amplitude for each path, $\alpha$ is the phase of the signal received by the first antenna element, which serves as reference, $\Delta\theta_i$ is the phase difference among antenna elements, determined by the direction of arrival of each path, and $\eta_{ni}$ is noise. The reason why an representation such as that of eq. (4) is possible is as follows. As shown in FIG. 3, if an equal-interval linear array antenna is assumed as the array antenna, and it is assumed that user radio waves arrive from the directions of the arrows, then the distances from the wave front WS to each of the antenna elements $51_1$ to $51_N$ are 0, $\delta$, $2\delta$, ... $(N-1)\delta$. If d is the antenna element spacing and $\lambda$ is the wavelength, then $\delta$ is $$\delta = (2\pi/\lambda)\cdot d\cdot\sin\varphi$$

A time equivalent to the distances $\delta$ to $(N-1)\delta$ is necessary from the arrival of the wave at the antenna element $51_1$ until arrival at the other antenna elements $51_2$ to $51_N$. If the time delay (phase difference) due to the distance $\delta$ is $\Delta\theta_1$, then eq. (4) is obtained.

The correlation calculation portion $62a_i$ of the phase difference estimator $62_i$ calculates $D_i$ through the correlation calculation of the following equation:

$$Di = \frac{1}{N-1}\sum_{n=1}^{N-1}\frac{x_{(n+1)i}}{x_{ni}} = \frac{1}{N-1}\sum_{n=1}^{N-1}\frac{a_{(n+1)i}\exp[j\{\alpha+n\Delta\theta i\}+\eta_{(n+1)i}}{a_{ni}\exp[j\{\alpha+(n-1)\Delta\theta i\}]+\eta_{ni}} \qquad (5)$$

Here, if it is assumed that the noise components $\eta_{ni}$ are sufficiently small, and that the signal amplitudes $a_{ni}$ (i=1, 2, ..., N) are substantially equal among antenna elements, then eq. (5) can be approximated, using the constants $C_i$, as $$D_i \cong C_i \exp\{j\Delta\theta_i\} \qquad (6)$$

If normalization with respect to $D_i$ is performed as in eq. (7), then approximate phase difference information can be extracted, as in eq. (8).

$$D_i' = \frac{D_i}{|D_i|} \qquad (7)$$

$$\cong \exp\{j\Delta\theta_i\} \qquad (8)$$

The $D_i'$ obtained in this way become the output of the correlation calculation portions $62a_i$, and indicate instantaneous phase difference estimates. The moving average computation portions $62b_i$ compute, for each slot, the moving average of the instantaneous phase difference estimates. That is, when the sth slot voltage profile is being created by the voltage profile generation portions $61_1$ to $61_N$, the moving average computation portions $62b_i$ (i=1 to L) outputs the moving average $D_i''^{(s)}$ of the most recent sth instantaneous phase difference estimate using the equation $$D_i''^{(s)} = \frac{1}{S}\sum_{r=1}^{s} D_i'^{(s-r+1)} \qquad (9)$$

The moving average $D_i''^{(s)}$ calculated using this eq. (9) is the estimated phase difference among the antenna elements at the ith sampling time (i=1 to L). In eq. (9), $D_i'^{(s)}$ is the output from the correlation calculation portion $62a_i$ for the sth slot, and s is the number of slots used in averaging.

The in-phase synthesis portion 64 uses the estimated phase differences $D_i''$ among antenna elements at the ith sampling time $t_i$ (i=1 to L) calculated as described above to perform the calculation of the following equation, $$x_i = \sum_{n=1}^{N} x_{ni}\{D_i''\}^{-(n-1)} \quad (1 \leq i \leq L) \qquad (10)$$

and outputs the synthesized voltage profiles $\{x_i \ldots x_L\}$. Then, the RAM 65 stores delay profiles obtained by conversion of the synthesized voltage profiles into power levels, and the path detection portion 65 performs path detection referring to the delay profiles.

In the searcher of the first embodiment, phase differences among antenna elements are estimated for each sample constituting a voltage profile, so that accurate in-phase synthesis of voltage profiles for each antenna element can be performed, regardless of the extent of dispersion in the directions of arrival of multiple paths. In other words, directionality, can be formed for each arriving path, and accurate path searches can be performed.

(C) Second Embodiment of a Searcher (a) Configuration

Figure 4:
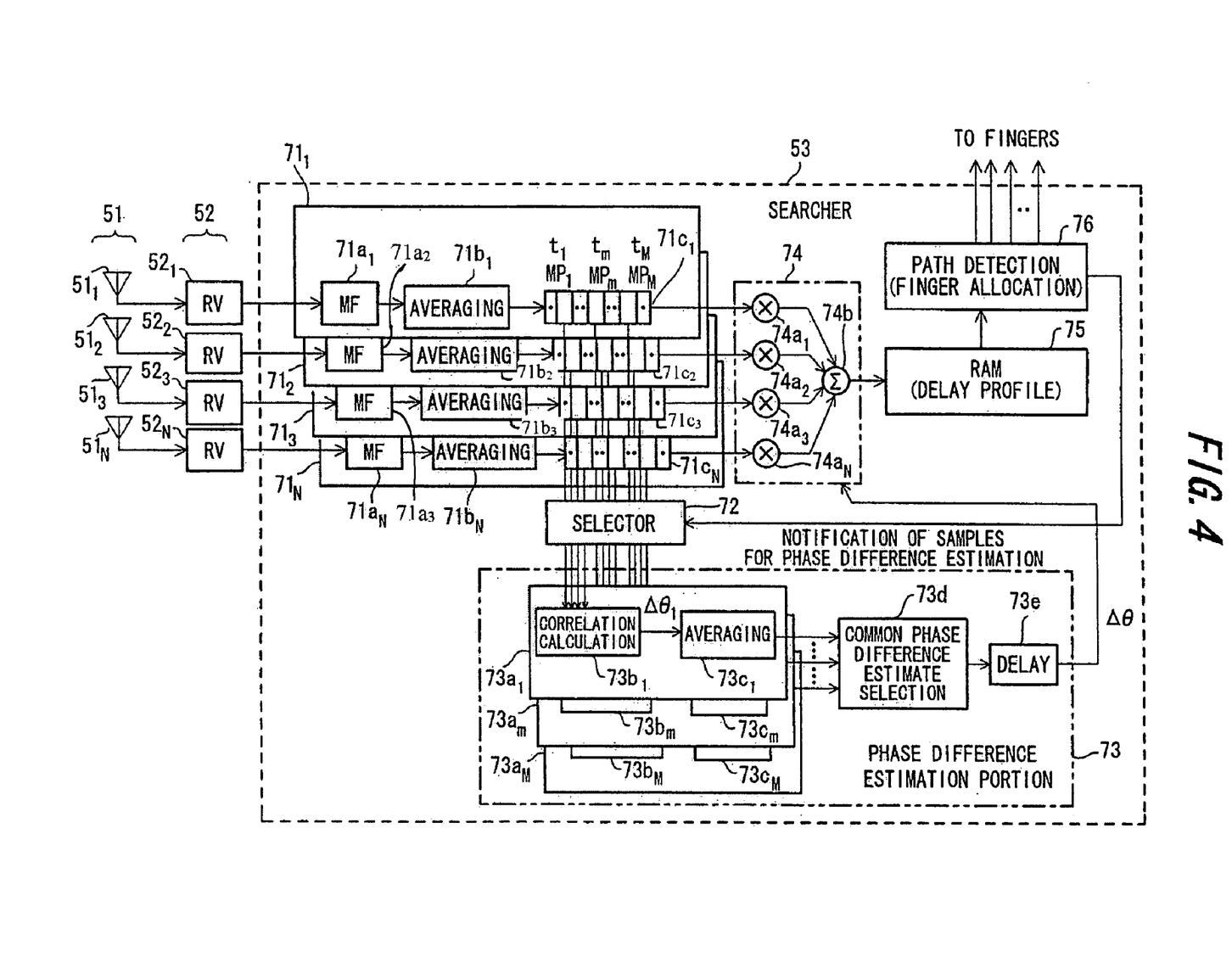
FIG. 4 is a view of the configuration of a second embodiment of a searcher of this invention.

FIG. 4 is a view of the configuration of a second embodiment of a searcher of this invention, as a preferred embodiment for the case in which the dispersion of the directions of arrival of multiple paths is small, and the amount of computation performed for phase difference estimation can be reduced compared with the first embodiment. In other words, in the searcher of the first embodiment, phase difference estimators $62_1$ to $62_L$ (FIG. 2) were provided corresponding to all times $t_1$ to $t_L$, and it was necessary to compute the estimated phase difference among antenna elements at each time; but in the searcher of the second embodiment, phase difference estimates need be computed only at the path timing of the multiple paths, so that the amount of computation can be reduced.

In the searcher 53, the voltage profile generation portions $71_1$ to $71_N$ take as input the QPSK detection signal (Q channel signal) output from the reception circuits $52_1$ to $52_N$, and generate a voltage profile for each antenna element. For example, the voltage profile generation portion $71_1$ ($71_2$ ... $17_N$) extracts one symbol's worth of the pilot signal component of its channel in the matched filter $71a_1$ ($71a_2$ ... $71a_N$), performs voltage addition of correlation output for each symbol of a prescribed pilot signal interval (for example, one slot interval) to perform averaging in the averaging circuit $71b_1$ ($71b_2$ ... $71b_N$), and stores in RAM $71c_1$ ($71c_2$ ... $71c_N$) the one symbol's worth (1 bit) of voltage profile averaged by the averaging circuit $71b_1$ ($71b_2$ ... $71b_N$). The voltage profile comprises first through Lth sample data items.

The selector 72 selects and outputs, from each of the voltage profiles, sample data corresponding to the path timing $t_1$ to $t_m$ to $t_M$ of the multiple paths, $MP_1$ to $MP_m$ to $MP_M$, detected in the previous slot.

The phase difference estimator 73 determines and outputs the phase difference estimate (common phase difference estimated value) $\Delta\theta$ among antenna elements at all sampled data times $t_1$ to $t_L$. The phase difference estimator 73 has phase difference estimation portions $73a_1$ to $73a_m$ to $73a_M$, which estimate phase differences among antenna elements with each of the path timings $t_1$ to $t_m$ to $t_M$; a common phase difference estimate selection portion $73d$, which selects a common phase difference estimate from the phase differences among antenna elements for each path timing; and a delay portion $73e$ which holds the common phase difference estimate for one slot interval, and outputs the estimate in the next slot.

The correlation calculation portion $73b_1$ of the phase difference estimator $73a_1$ takes as input sample data from each voltage profile according to the path timing $t_1$ of the first path $MP_1$ detected in the previous slot, via the selector 72, performs calculations of correlations among antenna elements using this sample data, and estimates and outputs the phase difference $\Delta\theta$ between antenna elements at the path timing $t_1$. The averaging circuit $73c_1$ computes the average value of S slots' worth of estimated phase differences obtained from the correlation calculations, and outputs the result every S slots. Similarly, the correlation calculation portions $73b_2$ to $73b_m$ to $73b_M$ of the phase difference estimators $73a_2$ to $73a_m$ to $73a_M$ take as input sample data from each voltage profile according to the path timings $t_2$ to $t_m$ to $t_M$ of the second through mth through Mth paths MP2 to $MP_m$ to $MP_M$ detected in the previous slot, via the selector 72, calculates correlations among antenna elements using this sample data, and estimates and outputs phase differences $\Delta\theta_2$ to $\Delta74_m$ to $\Delta\theta_M$ between antenna elements at the path timings $t_2$ to $t_m$ to $t_M$. The averaging circuits $73c_2$ to $73c_m$ to $73c_M$ compute and output the average value of S slots' worth of estimated phase differences obtained from the correlation calculations.

The common phase difference estimate selection portion $73d$ selects the maximum average value (phase difference estimate) among the average values output from the phase difference estimators $73a_1$ to $73a_M$ as the common phase difference estimate among the antenna members for all timings. If a path detected in the previous slot exists with certainty, the S slots' worth average value of phase difference estimates corresponding to this path will be large. On the other hand, if a path is erroneously detected due to noise or other factors, the S slots' worth average value of phase difference estimates for that path will be small. The common phase difference estimate selection portion $73d$ selects a phase difference estimate according to the path timing for which the average value is maximum, that is, according to the most reliable path timing, and sets this as the common phase difference estimate $\Delta\theta$.

The in-phase synthesis portion 74 uses the common phase difference estimate $\Delta\theta$ to coordinate the phases of the received signal voltage provides of each antenna element for all the timings $t_1$ to $t_L$, performs synthesis, and outputs the synthesized voltage profile. In other words, the in-phase synthesis portion 74 comprises multipliers $74a_1$ to $74a_n$ and a synthesis portion $74b$; the multipliers $74a_1$ to $74a_N$ shift the phases of the voltage profiles of the first through Nth antenna elements by $(n-1) \cdot \Delta\theta$ (n=1 to N) at each time $t_1$ to $t_L$, and the synthesis portion $74b$ synthesizes and outputs the outputs of each of the multipliers. The multipliers $74a_1$ to $74a_N$ shift the phase by multiplying the input signal by $\exp[-j(n-1)\cdot\Delta\theta]$.

The RAM 75 stores the delay profile obtained by converting the synthesized voltage profile output from the in-phase synthesis portion 74 into power levels; the path detection portion 76 detects the path timings of the multiple paths, referring to the delay profile, and inputs timing information for the start of despreading and delay time information to the fingers $54_1$ to $54_M$ (cf. FIG. 1), according to the respective paths.

(b) Estimation of Phase Differences Among Antenna Elements

Figure 5:
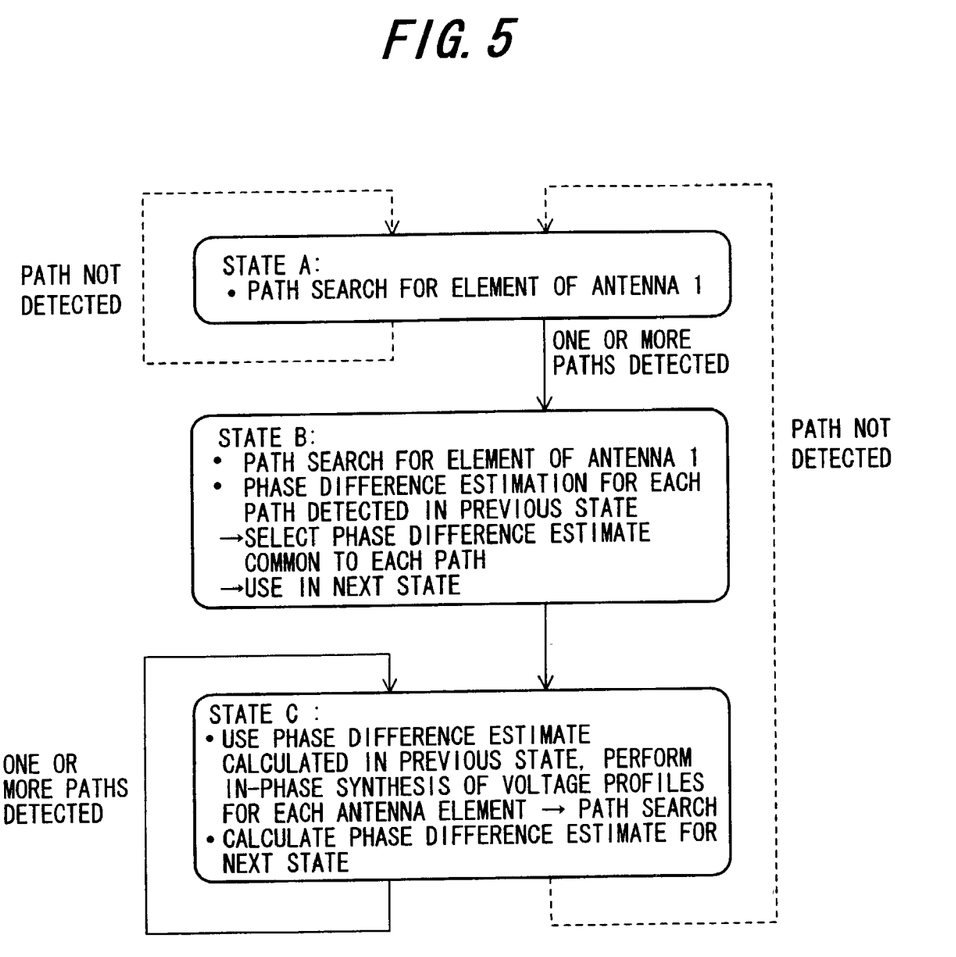
FIG. 5 explains the path search procedure of the second embodiment of a searcher of this invention.

In the second embodiment, with the premise that dispersion in the directions of arrival of the multiple paths is small, path searches are realized, and there are three types of operating states for the path search. FIG. 5 is a state transition diagram showing the path search procedure; the initial state is state A, and state transitions are performed at each slot from state A, and every cycle in which a new common phase difference estimate is output (every S slots) from states B and C, based on the number of paths detected in the previous state.

State A

In the initial state, a path search is performed based on the output signal of one antenna element, for example, the first antenna element $51_1$. That is, if the ith sample of the voltage profile for the first antenna element is $x_{1i}$, then in the in-phase synthesis portion 74 of FIG. 4, $xi=x_{1i}$ ($0 \leq i \leq L$) is calculated, and the voltage profile $\{x_1 \ldots x_L\}$ is generated. In the initial state, the phase difference estimator 73 does nothing, and is in a wait state.

State B

Similarly to state A, a path search is performed for an element of the antenna 1. In the phase difference estimator 73, phase differences are estimated by the phase difference estimators $73a_1$ to $73a_M$ for each of the paths $MP_1$ to $MP_M$ detected in the previous slot. For example, in the case of the phase difference estimator $73a_m$, the correlation calculation portion $73b_m$ estimates the phase difference for the path $MP_m$ through correlation calculations for the path $MP_m$ described below. Specifically, first $D_m$ is calculated using the following equation.

$$D_m = \qquad\qquad\qquad\qquad (11)$$

-continued $$\frac{1}{N-1}\sum_{n=1}^{N-1}\frac{x_{(n+1)m}}{x_{nm}} = \frac{1}{N-1}\sum_{n=1}^{N-1}\frac{a_{(n+1)m}\exp[j\{\alpha+n\Delta\theta_m\}]+\eta_{(n+1)m}}{a_{nm}\exp[j\{\alpha+(n-1)\Delta\theta_m\}]+\eta_{nm}}$$

If it is assumed that the noise components $\eta_{nm}$ are small, and that the signal amplitudes $a_{nm}$ are substantially the same among antenna elements, then constants $C_m$ can be used to approximate eq. (11) as follows.

$$D_m \cong C_m \exp\{j\Delta\theta_m\} \quad (12)$$

Hence if $D_m$ is normalized as in eq. (13), the approximate phase difference information can be extracted as in eq. (14).

$$D'_m = \frac{D_m}{|D_m|} \quad (13)$$

$$\cong \exp\{j\Delta\theta_m\} \quad (14)$$

The $D_m'$ obtained in this way becomes the output of the correlation calculation portion $73b_m$, and indicates the instantaneous phase difference estimate. The averaging circuit $73c_m$ averages and outputs S slots' worth of instantaneous phase difference estimates obtained by the correlation calculation portion $73b_m$. That is, S slots' worth of a voltage profile is generated from the voltage profiles $71_1$ to $71_N$, and each time S slots' worth of instantaneous phase difference estimates are computed by the correlation calculation portion $73b_m$, the averaging circuit $73c_m$ outputs a new average phase difference estimate $D_m''$ as indicated by the equation $$D''_m = \frac{1}{S}\sum_{r=1}^{S} D_m'^{(r)} \quad (15)$$

In eq. (15), $D_m'^{(r)}$ is the instantaneous phase difference estimate for the rth slot, output from the correlation calculation portion $73b_m$.

Here, if the path $MP_m$ is an erroneously detected path—that is, if it is not a path—then the phase terms $x_{(n+1)m}/x_{nm}$ in eq. (11) will take on various values for different values of n, so that the absolute value of their average $|D''_m|$ will be a small value. The common phase difference estimate selection portion $73d$ selects the path for which $|D''_m|$ is maximum, that is, the "max" path for which $|D_{max}''| \geq |D_m''|$ ($1 \leq m \leq M$), as a path which exists with certainty, and uses $D''_{max}$ as the phase difference information common to each path.

State C

In state C, the in-phase synthesis portion 74 uses the phase difference estimate $D''_{max}$ common to each path, obtained in the previous state (previous slot), to calculate the following equation, $$xi = \sum_{n=1}^{N} x_{ni}\{D''_{max}\}^{-(n-1)} \quad (1 \leq i \leq L) \quad (16)$$

and outputs the synthesized voltage profile $\{x_1 \ldots x_L\}$. Subsequently, the RAM 75 stores the delay profile obtained by converting this synthesized voltage profile into power levels, and the path detection portion 76 performs path detection referring to the delay profile.

On the other hand, the phase difference estimator 73 calculates the phase difference estimate common to each path to be used in the next state, similarly to the calculation in the state B.

Following this, the above operations are repeated. If no path is detected in state C, the system returns to state A, and the above operations are repeated.

Because, in the searcher of the second embodiment, it is necessary to compute only the phase difference estimates with the path timing of the multiple paths detected in the previous slot, the amount of computation can be reduced, and moreover the hardware configuration can be simplified, so that this searcher is preferred in cases where the dispersion in the directions of arrival of the multiple paths is small. In other words, the searcher of the second embodiment detects the path which exists with greatest certainly among the multiple paths, focuses on this path to form a directionality, and then performs a search for multiple paths, so that the amount of computation can be reduced, and accurate multiple path detection can be performed when the dispersion in the directions of arrival of the multiple paths is small.

By means of the above invention, it is possible to utilize the effect of an improved antenna gain through array processing not only in finger portions, but in the searcher as well, so that high-precision path searching becomes possible even in conjunction with transmission power control, greatly contributing to the realization of a wireless base station employing an array antenna in a DS/CDMA mobile communication system.

What is claimed is:

1. A searcher in a CDMA receiver having an array antenna, comprising:
    a voltage profile generation portion, which executes correlation computation for signals received by each antenna element, and generates received signal voltage profiles;
    a phase difference estimation portion, which performs correlation calculations among antenna elements using sample data at the same time from each voltage profile, estimates the phase differences among antenna elements at said time, and similarly estimates phase differences among antenna elements at different times;
    an in-phase synthesis portion, which uses phase difference estimates at a prescribed time to coordinate the phases of the voltage profiles for each of the antenna elements at said time and perform synthesis, and which similarly coordinates the phases of voltage profiles for each of the antenna elements at other times and performs synthesis; and,
    a path detection portion, which detects the path timing of multiple paths based on the synthesized profiles obtained by the in-phase synthesis portion.

2. The searcher according to claim 1, wherein said voltage profile generation portion comprises, for each antenna element, a matched filter which performs correlation computations for received signals, an averaging portion which averages and outputs correlation computation results, and a storage portion which stores correlation computation results averaged at each sampling time as a voltage profile.

3. The searcher according to claim 1, wherein said phase difference estimation portion comprises, for each sampling time, a correlation computation portion which performs correlation computations among antenna elements using sample data at the sampling time for each voltage profile and which estimates the phase differences among antenna elements at said time, and a moving average computation portion which outputs a moving average of the estimated phase differences as the phase difference among antenna elements at said time.

4. The searcher according to claim 1, wherein said in-phase synthesis portion comprises a phase-shifting portion, which uses a phase difference estimate $\Delta\theta_i$ between adjacent antenna elements at a prescribed time $t_i$ to shift the phases of the voltage profiles of the first through Nth antenna elements by $(n-1)\cdot\Delta\theta_i(n=1$ to N) respectively, and a synthesis portion which synthesizes the outputs of each of the phase-shifting portions.

5. A CDMA receiver having an array antenna, comprising:
a searcher which detects the path timing of multiple paths;
a plurality of despreading/delay time adjustment portions, provided for each of multiple paths, which perform delay adjustment according to the path timing, despreading processing, and phase rotation processing of signals output from each antenna element, and perform synthesis; and,
a RAKE synthesis/data discrimination portion, which synthesizes the output signals from each despreading/delay time adjustment portion, and discriminates received data based on the synthesized signal;
wherein said searcher comprises:
a voltage profile generation portion, which performs correlation computation of received signals for each antenna element and generates received signal voltage profiles;
a phase difference estimation portion, which performs correlation calculations among antenna elements using sample data at the same time from each voltage profile, estimates phase differences among antenna elements at said time, and similarly estimates phase differences among antenna elements at each time;
an in-phase synthesis portion, which uses phase difference estimates at a prescribed time to coordinate the phases of voltage profiles for each antenna element at said time and perform synthesis, and which similarly coordinates the phases and performs synthesis of voltage profiles for each antenna element at other times; and,
a path detection portion, which detects the path timing of multiple paths based on the synthesized profile obtained by the in-phase synthesis portion.

6. A searcher in a CDMA receiver employing an array antenna, comprising:
a voltage profile generation portion, which performs correlation computation of received signals for each antenna element, and generates voltage profiles;
a phase difference estimation portion, which uses sample data corresponding to a prescribed path timing detected at the prior time of detection among the sample data constituting each voltage profile to perform correlation calculations among antenna elements, calculates phase difference estimates among antenna elements at said path timing, similarly performs correlation calculations among antenna elements using sample data corresponding to other path timings, calculates phase difference estimates among antenna elements at said path timings, and sets said phase difference estimate among antenna elements at the path timing with the maximum correlation value as the common phase difference estimate among antenna elements at all timings;
an in-phase synthesis portion, which uses said common phase difference estimate for all timings to coordinate the phases of received signal voltage profiles for all antenna elements and performs synthesis; and,
a path detection portion, which detects the path timing of multiple paths based on the synthesized profile obtained by the in-phase synthesis portion.

7. The searcher according to claim 6, wherein said voltage profile generation portion comprises, for each antenna element, a matched filter which performs correlation computations of received signals, an averaging portion which averages and outputs correlation computation results, and a storage portion, which stores averaged correlation computation results at each sampling time as voltage profiles.

8. The searcher according to claim 6, wherein said phase difference estimation portion comprises:
a selector, which selects, from among sample data constituting each voltage profile, sample data corresponding to each path timing detected at the previous detection time;
a plurality of correlation computation portions, provided for each path timing, which use sample data corresponding to a prescribed path timing output from the selector to perform correlation calculations among antenna elements at said timing, and computes phase difference estimates among antenna elements;
an averaging portion, which calculates the average value in a prescribed interval of said phase difference estimates; and,
a common phase difference determination portion, which determines said phase difference estimate among antenna elements at the path timing for which the average value is maximum, as the common phase difference estimate among antenna elements at all timings.

9. The searcher according to claim 6, wherein said in-phase synthesis portion comprises a phase-shifting portion, which uses the common phase difference estimate $\Delta\theta$ at all timings to shift the phases of the first through Nth antenna element voltage profiles by $(n-1)\cdot\Delta\theta(n=1$ to N) respectively, and a synthesis portion which synthesizes each of the phase-shifted outputs.

10. A CDMA receiver comprising an array antenna, further comprising:
a searcher which detects the path timing of multiple paths;
a plurality of despreading/delay time adjustment portions, provided for each of multiple paths, which perform delay adjustment according to the path timing, despreading processing, and phase rotation processing of signals output from each antenna element, and perform synthesis; and,
a RAKE synthesis/data discrimination portion, which synthesizes the output signals from each despreading/delay time adjustment portion, and discriminates received data based on the synthesized signal;
and wherein said searcher comprises:
a voltage profile generation portion, which performs correlation computation of received signals for each antenna element and generates voltage profiles;
a phase difference estimation portion, which uses sample data corresponding to a prescribed path timing detected at the previous detection time, among sample data constituting each voltage profile, to perform correlation calculations among antenna elements, calculates phase difference estimates among antenna elements at said path timing, similarly performs correlation calculations among antenna elements using sample data corresponding to each path timing, calculates phase difference estimates among antenna elements at said path timings, and sets said phase difference estimate among antenna elements at the path timing with the maximum correlation value as the common phase difference estimate among antenna elements at all timings;

an in-phase synthesis portion, which uses said common phase difference estimate to coordinate the phases of received signal voltage profiles for each antenna element at all timings and perform synthesis; and, a path detection portion, which detects the path timing of multiple paths based on the synthesized profile obtained by the in-phase synthesis portion.

* * * * *